United States Patent [19]

Abe et al.

[11] Patent Number: 5,615,519
[45] Date of Patent: Apr. 1, 1997

[54] METHOD FOR RAISING SEEDLING

[75] Inventors: Yoshimi Abe; Shinji Murai, both of Jushiyama-mura, Japan

[73] Assignee: M-Hydroponics Research Co., Ltd., Aichi, Japan

[21] Appl. No.: 436,313

[22] PCT Filed: Sep. 8, 1994

[86] PCT No.: PCT/JP94/01490

§ 371 Date: Jul. 6, 1995

§ 102(e) Date: Jul. 6, 1995

[87] PCT Pub. No.: WO95/07017

PCT Pub. Date: Mar. 16, 1995

[30] Foreign Application Priority Data

Sep. 9, 1993 [JP] Japan ................................. 5-250213

[51] Int. Cl.⁶ ........................................... A01G 31/00
[52] U.S. Cl. ................. 47/59; 47/58; 47/DIG. 3; 47/82
[58] Field of Search ................. 47/58.01, 58 T, 47/58 HP, 59, DIG. 3, 82, 83

[56] References Cited

U.S. PATENT DOCUMENTS

| 297,932 | 4/1884 | Groves | 47/82 |
| 2,756,541 | 7/1956 | Berger | 47/82 |
| 4,869,019 | 9/1989 | Ehrlich | 47/82 |

FOREIGN PATENT DOCUMENTS

| 012011 | 6/1980 | European Pat. Off. | 47/82 |
| 3516744 | 11/1986 | Germany | 47/82 |
| 9120037 | 3/1990 | Japan | 47/82 |
| 815195 | 3/1981 | U.S.S.R. | 47/82 |

OTHER PUBLICATIONS

Plant Propagation Principles and Practices ©1986 by Prentice–Hall Inc. p. 491.

*Primary Examiner*—Henry E. Raduazo
*Attorney, Agent, or Firm*—Donald S. Dowden

[57] ABSTRACT

The object of the present invention is to clip and collect seedlings easily and effectively from runners of a parent plant such as strawberry. To attain this object, a method for raising seedlings comprising; planting a parent plant in a plant bed disposed in a high position, growing plural runners linked mutually to hang from said parent plant in said plant bed, attaching water absorbing block to each rooting part between runners hanging in midair, supplying water to each water block to grow root and seedling from said rooting part, and clipping and collecting the resulting seedlings from runners is provided.

2 Claims, 4 Drawing Sheets

METHOD FOR RAISING SEEDLING

FIELD OF THE INVENTION

The present invention relates to a method for raising seedling such as strawberry, tomato, and the like.

DESCRIPTION OF THE PRIOR ART

Hitherto, as shown in FIG. 7, seedlings have been grown by a method comprising; planting parent plant (2) in a soil bed (1) to grow plural runners linked mutually (3A, 3B, 3C, 3D), inserting rooting parts (4) between said runners (3A, 3B, 3C, 3D) into a water absorbing block (5) made of a rock wool, a polyurethane foam, and the like, putting said water absorbing block (5) into said soil bed (1) to grow roots and seedlings (6) from said rooting parts (4). The resulting seedlings (6) growing from said rooting parts (4) are then clipped with said rooting parts (4) inserted in said water absorbing block (5) from runners (3A, 3B, 3C, 3D) and said clipped seedlings (6) are originally pre-planted with said water absorbing block (5) by the water culture or the soil culture and after the differentiation of flower bud, said seedlings (6) are planted permanently. Nevertheless, in said traditional method, a prodigious labor has been necessary for workers to raise and pick seedlings because said traditional method use the soil bed (1) and workers must stoop down to plant parent plants (2), bury rooting parts (4) and pick seedlings (6).

DISCLOSURE OF THE INVENTION

As a means to solve the above described problem in said traditional method, a method for raising seedlings comprising; planting a parent plant (12) in a plant bed (11) disposed in a high position, growing plural runners linked mutually (13A, 13B, 13C, 13D) to hang from said parent plant (12) in said plant bed (11), attaching water absorbing block (15) to each rooting part (14) between said runners (13A, 13B, 13C, 13D) hanging in midair, supplying water to each water absorbing block (15) to grow root and seedling (16) from said rooting part (14) and clipping and collecting the resulting seedlings (16) from runners (13A, 13B, 13C, 13D) is provided in the present invention.

In the present invention, as said plant bed (11) is disposed in a high position, workers can attach said water absorbing block (15) to said runners (13A, 13B, 13C, 13D) growing from said parent plant (12) planted in said plant bed (11) in a comfortable position and the prodigious labor that workers stoop down to bury said rooting parts in the soil bed is saved.

Then water is supplied to said water absorbing block (15) hanging in midair to grow roots and seedlings (16) from said rooting parts (14). After the growth of seedlings (16) are completed, the resulting seedlings (16) are clipped from runners (13A, 13B, 13C, 13D). As said seedlings (16) hanging in midair, workers can clip said seedlings (16) in a comfortable position and the prodigious labor that workers stoop down to clip seedlings in the soil bed is saved.

Accordingly, in the present invention, the seedlings can be raised very easily and efficiently. The present invention can be applied all kind of plants whose seedlings grow from rooting parts between runners and said plants are such as strawberry, tomato, sweet potato and the like.

[FIG.] 1 a side view

Figure 1:
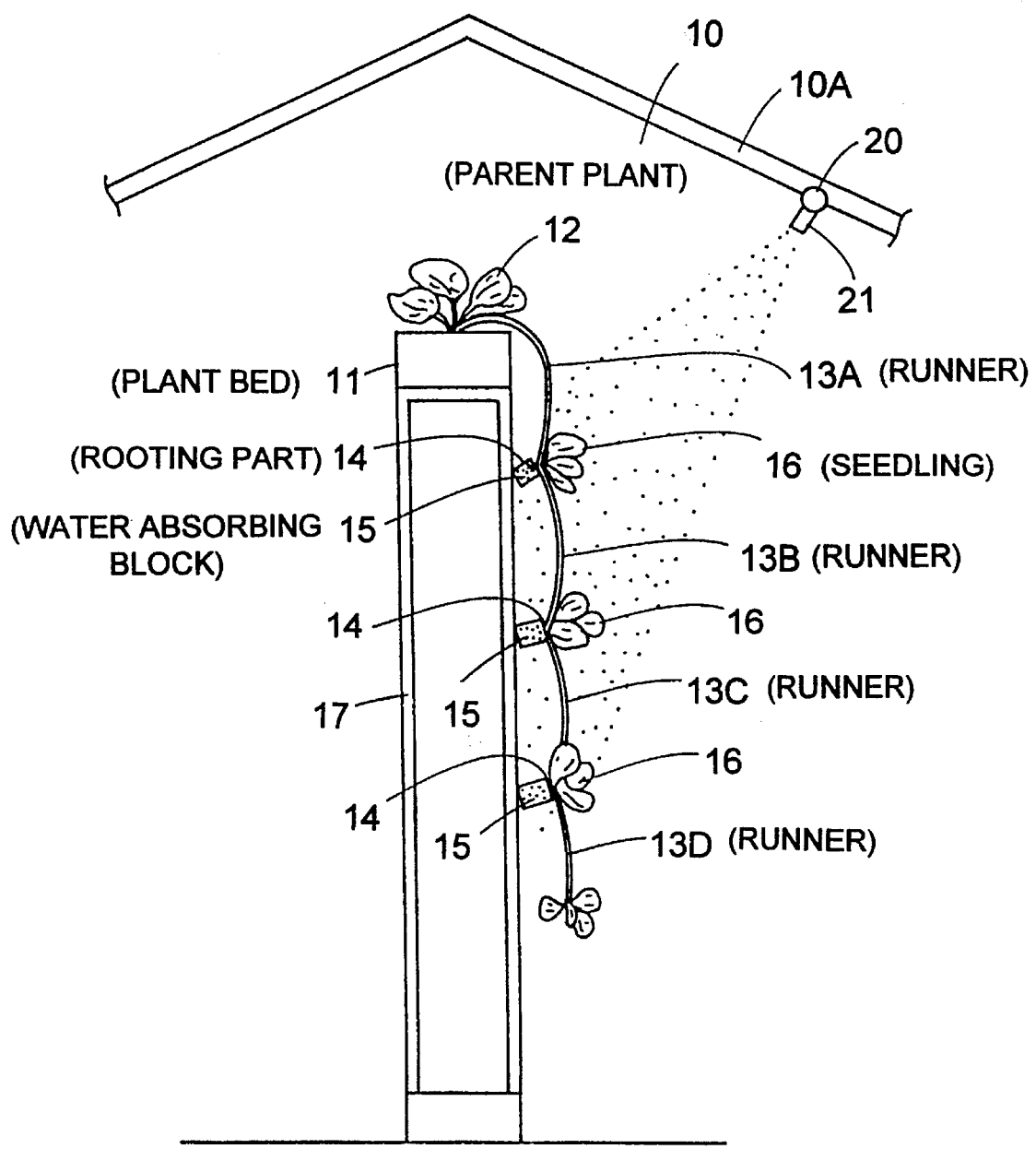
FIGS. 1 to 6 show an embodiment of the present invention.

[FIG.] 2 a cross section of plant bed

[FIG.] 3 a partially omitted front view

[FIG.] 4 an explanatory drawing of pre-attachment of water absorbing block

[FIG.] 4 an explanatory drawing of attachment of water absorbing block

[FIG.] 6 a perspective view of pre-plant bed

[FIG.] 7 a sectional view of the prior art

EXPLANATION OF THE MARK

(11) . . . plant bed
(12) . . . parent plant
(13) A,(13)B,(13)C,(13)D . . . runners
(14) . . . rooting part
(15) . . . water absorbing block
(16) . . . seedling
(20) . . . water supplying pipe
(21) . . . nozzle

DETAIL DESCRIPTION OF THE INVENTION

Figure 2:
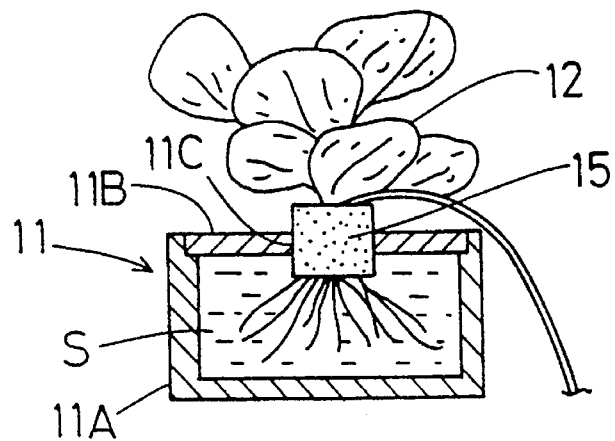

The present invention is described by an embodiment shown in FIGS. 1 to 6. Referring to Figures, a plant bed is put on a frame (17) to disposed in a high position in a green house (10). As shown in FIG. 2, said plant bed (11) consists of a bed body (11)A in to which a cultivating solution S is supplied, a perforated panel (11)B which is put on said bed body (11)A, and water absorbing block (15) carrying parent plants (12) such as strawberry and inserted in each hole (11)C of said perforated panel (11)B.

Figure 3:
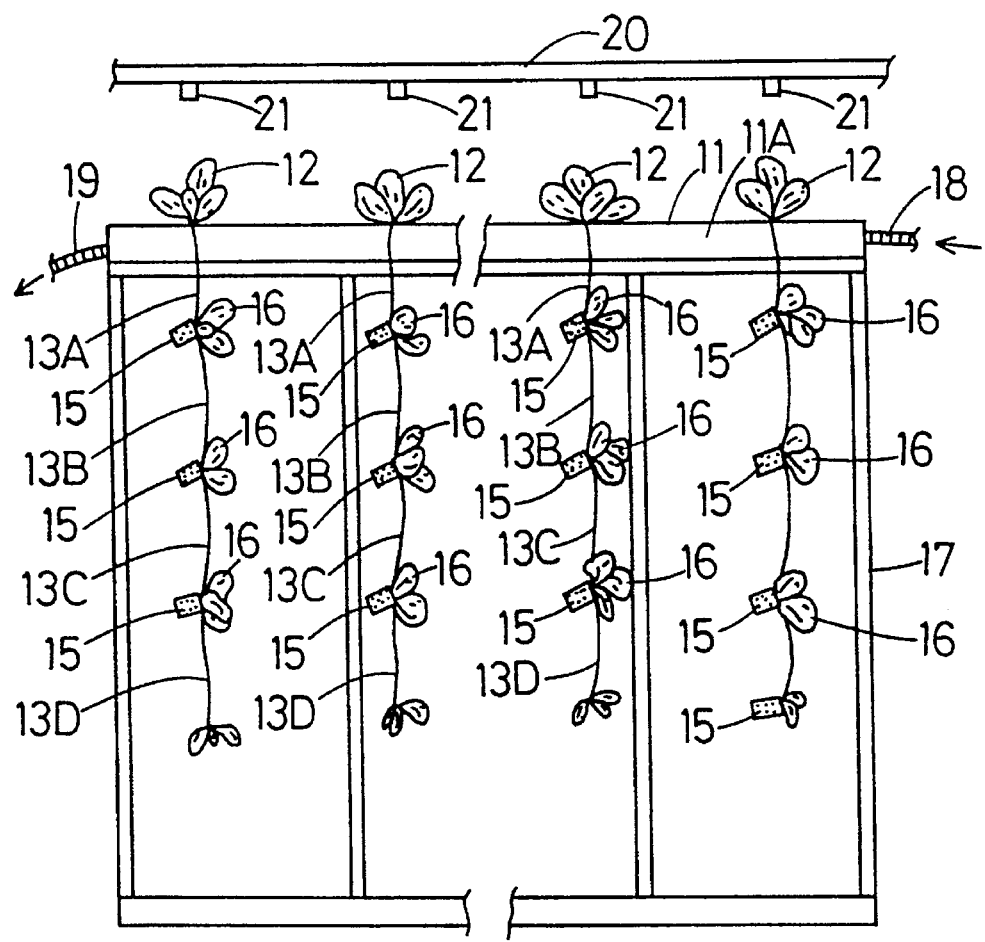

Said cultivating solution S is supplied into said bed body (11)A of said plant bed (11) from an inlet (18) of said bed body (11)A and exhausted from an outlet (19) of said bed body (11)A as shown in FIG. 3 and to obtain a smooth flow of said cultivating solution S in said bed body (11)A, said bed body (11)A is disposed such that the inlet side of said bed body (11)A is located in a little higher position than the outlet side of said bed body (11)A.

As above described, said parent plants (12) are cultured by the water culture system, and at first, the first runner (13)A grows hanging from said parent plants (12) and then the second runner (13)B grows from the end of said first runner (13)A.

Figure 4:
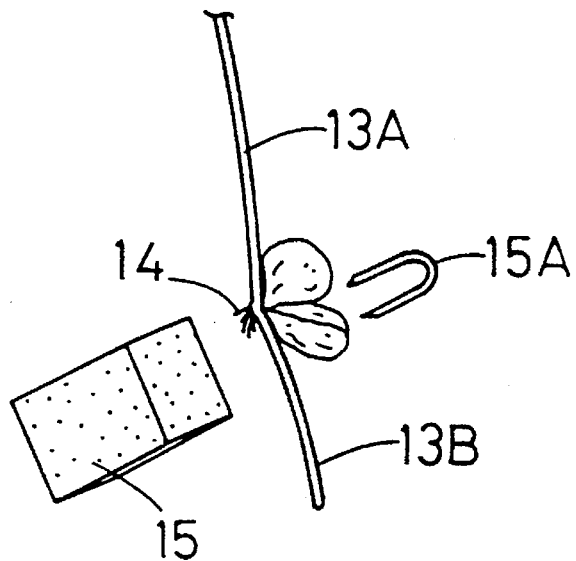
Figure 5:
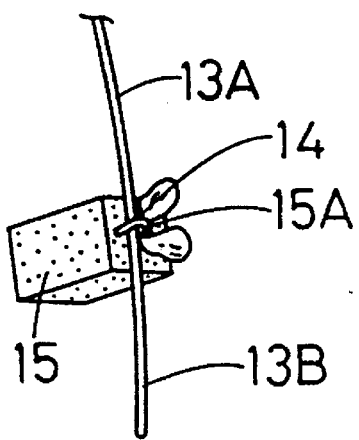

Since the boundary between the first runner (13)A and the second runner (13)B becomes a rooting part (14) from which a root and a seedling grow, a water absorbing block (15) is attached to each rooting part (14) by U-shaped pin (15)A as shown in FIG. 4 and FIG. 5. In the present invention, workers can attach said water absorbing blocks (15) to said rooting parts (14) hanging in midair in a comfortable position without stooping down and the water is sprinkled from nozzles (21) of a water supplying pipe (20) to supply the water at a proper time to said water absorbing blocks (15) hanging in midair.

As above described, the second runner (13)B grows and further the third runner (13)C grows from the end of said second runner (13)B and still further the forth runner (13)D grows from the end of said third runner (13)C and the water absorbing blocks (15) are successively attached to a rooting part (14) between the second runner (13)B and the third runner (12)C and a rooting part (14) between the third runner (12)C and the forth runner (13)D, and then the water is supplied from said nozzle (21) to each water absorbing block (15) hanging in midair. In the case of strawberry, generally the forth runner (13)D will be the last runner.

As above described, seedlings (16) are grown from said rooting parts (14) hanging in midair by supplying the water from the nozzle (21) and when seedlings completely grow, the resulting seedlings (16) is clipped from said runners (13A, 13B, 13C, 13D) to collect said seedlings (16) and workers can clip and collect said seedlings (16) hanging in midair in a comfortable position without stooping.

Figure 6:
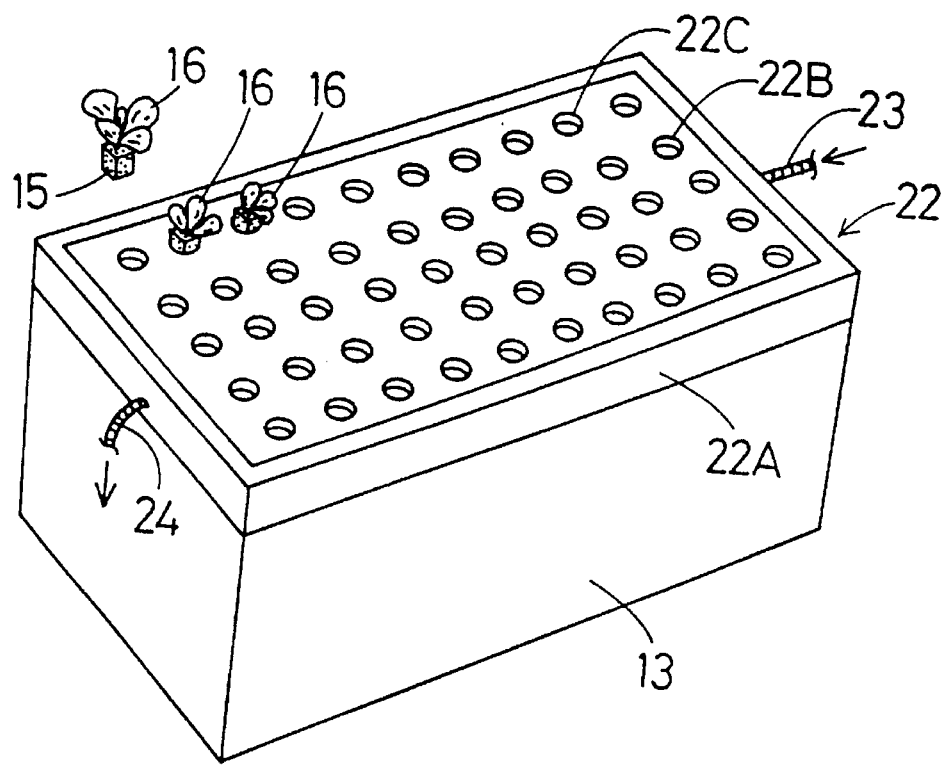
Figure 7:
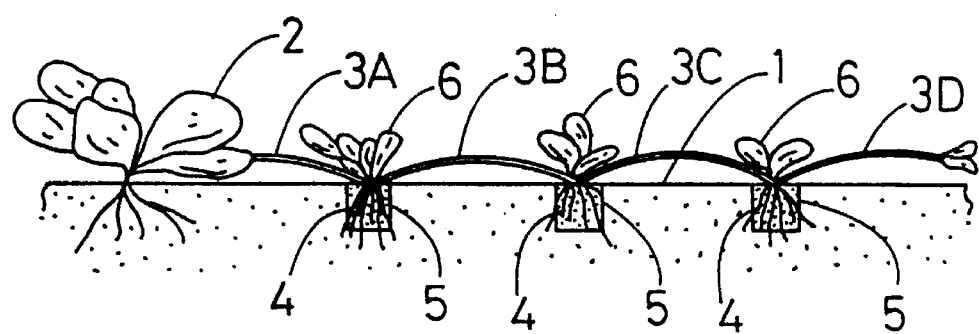

Said collected seedlings (16) are pre-planted with said water absorbing blocks (15) in a pre-plant bed (22) as shown in FIG. 6 and said pre-plant bed (22) consists of a bed body (22)A and a perforated panel (22)B putting on said bed body (22)A and said pre-plant bed (22) is put on a table (13) and each water absorbing block (15) carting the seedling (16) is inserted into a hole (22)C of said perforated panel (22)B. A cultivating solution is supplied in said bed body (22)A from an inlet (23) and exhausted from an outlet (24) of said bed body (22)

As above described, seedlings (16) are pre-planted in said pre-plant bed (22) and after the differentiation of flower bud, said seedlings (16) are planted permanently in a permanent plant bed. Said seedlings (16) may also be pre-planted in a soil bed (1) and also planted permanently in a soil bed (1). A traditional polyurethane foam block, a traditional rock wool block and the like can be used as a water absorbing block (15) in the present invention, and further, a decomposable block such as a pulp block, a wood fiber block, a vegetable fiber block, a paper block and the like is also usable in the present invention and in a case where said decomposable block is used as a water absorbing block in the soil culture in preplantation or permanent plantation, the wasted decomposable block can be left in the soil since said block is decomposed by the bacteria in the soil and in the case of water culture, the compost can be obtained by decomposition of the wasted blocks.

We claim:

1. A method for raising seedlings comprising; planting a parent plant in a plant bed disposed in a high position, growing plural runners linked mutually to hang from said parent plant in said plant bed, attaching water absorbing block to each rooting part between runners hanging in midair, supplying water to each water block to grow root and seedling from said rooting part, and clipping and collecting the resulting seedlings from runners.

2. A method in accordance with claim 1, said seedling is strawberry.

* * * * *